United States Patent
Iwasaki et al.

(10) Patent No.: US 10,997,400 B2
(45) Date of Patent: May 4, 2021

(54) INTEREST MAINTAINING SYSTEM AND SERVER

(71) Applicants: Kabushiki Kaisha Toshiba, Minato-ku (JP); Toshiba Digital Solutions Corporation, Kawasaki (JP)

(72) Inventors: Motokazu Iwasaki, Chiba (JP); Genki Fukatsu, Katsushika (JP); Kazuhiro Shimada, Kunitachi (JP); Keisaku Nakamura, Fuchu (JP); Satoko Kikuchi, Soka (JP); Masaru Watabiki, Yokohama (JP); Yuuka Asaumi, Ota (JP); Kanako Miyawaki, Ota (JP); Masakazu Kashita, Osaka (JP); Shinsuke Iuchi, Yokohama (JP)

(73) Assignees: Kabushiki Kaisha Toshiba, Minato-ku (JP); Toshiba Digital Solutions Corporation, Kawasaki (JP)

( * ) Notice: Subject to any disclaimer, the term of this patent is extended or adjusted under 35 U.S.C. 154(b) by 132 days.

(21) Appl. No.: 16/368,187

(22) Filed: Mar. 28, 2019

(65) Prior Publication Data
US 2019/0228216 A1 Jul. 25, 2019

Related U.S. Application Data

(63) Continuation of application No. PCT/JP2017/033773, filed on Sep. 19, 2017.

(30) Foreign Application Priority Data

Sep. 29, 2016 (JP) .............................. JP2016-191117

(51) Int. Cl.
*G06K 9/00* (2006.01)
*G06F 3/01* (2006.01)
(Continued)

(52) U.S. Cl.
CPC .......... *G06K 9/00335* (2013.01); *G06F 3/011* (2013.01); *G06F 3/013* (2013.01);
(Continued)

(58) Field of Classification Search
CPC ..................................................... G06Q 50/10
See application file for complete search history.

(56) References Cited

U.S. PATENT DOCUMENTS

2012/0260944 A1* 10/2012 Martins, Jr. ........... A47L 9/2842
134/18
2014/0002352 A1* 1/2014 Jacob ....................... G09G 5/00
345/156
(Continued)

FOREIGN PATENT DOCUMENTS

| JP | 2005-250322 | 9/2005 |
| JP | 2006-293979 | 10/2006 |

(Continued)

OTHER PUBLICATIONS

International Search Report dated Dec. 12, 2017 in PCT/JP2017/033773, filed on Sep. 19, 2017 (with English Translation).

*Primary Examiner* — Edward Park
(74) *Attorney, Agent, or Firm* — Oblon, McClelland, Maier & Neustadt, L.L.P.

(57) ABSTRACT

A childcare support service offering system includes a terminal and a server. The terminal includes a camera and performs operation control and processing of transmitting terminal usage situation data including image data acquired by being picked up by the camera to the server. The server performs image analysis on the received image data, recognizes the user that watches the terminal, judges a gaze of the recognized user, and judges a degree of interest for the terminal based on the gaze. When the judged degree of interest becomes equal to or less than a predetermined threshold value, the server transmits a changing instruction (Continued)

for causing an operation in the terminal to be changed to another operation to the terminal.

20 Claims, 7 Drawing Sheets

(51) Int. Cl.
    *G06T 7/70*           (2017.01)
    *H04N 21/6543*    (2011.01)
    *G06Q 50/10*       (2012.01)
    *H04N 21/258*     (2011.01)
    *H04N 21/239*     (2011.01)

(52) U.S. Cl.
    CPC ......... *G06K 9/00362* (2013.01); *G06Q 50/10* (2013.01); *G06T 7/70* (2017.01); *H04N 21/239* (2013.01); *H04N 21/258* (2013.01); *H04N 21/6543* (2013.01); *G06F 2203/011* (2013.01); *G06T 2207/30201* (2013.01)

(56) References Cited

U.S. PATENT DOCUMENTS

| | | | |
|---|---|---|---|
| 2015/0058812 A1* | 2/2015 | Lindh | G06F 3/012 |
| | | | 715/863 |
| 2016/0225012 A1* | 8/2016 | Ha | G06Q 30/0277 |
| 2017/0148434 A1* | 5/2017 | Monceaux | B25J 11/0015 |

FOREIGN PATENT DOCUMENTS

| | | |
|---|---|---|
| JP | 2014-115897 | 6/2014 |
| JP | 2016-12914 | 1/2016 |
| JP | 2016-109897 | 6/2016 |

* cited by examiner

INTEREST MAINTAINING SYSTEM AND SERVER

CROSS REFERENCE TO RELATED APPLICATION

This application is a continuation application of PCT/JP2017/033773 filed on Sep. 19, 2017 and claims benefit of Japanese Application No. 2016-191117 filed in Japan on Sep. 29, 2016, the entire contents of which are incorporated herein by this reference.

BACKGROUND OF INVENTION

1. Field of the Invention

An embodiment described herein relates generally to an interest maintaining system and a server.

2. Description of the Related Art

Hitherto, for example, in a field of education, a remote education system that enables a video of a class of a remote lecturer to be seen through a terminal or a huge screen with use of the Internet and the like has existed. The system as above not only can alleviate a burden on a lecturer but also enables a larger number of students to attend the same class.

In recent years, for example, in a field of nursing, service offering for rehabilitation of residents has been performed with use of a robot in facilities and the like. A robot that talks and performs physical exercises not only is helpful in the rehabilitation of the residents but also leads to alleviation of a workload of nursing care staff.

Offering service to use a communication system or a robot as above is performed not only in fields of nursing, education, and the like but also in various fields.

In the service using the communication system or the robot as above, when a person on a side that receives the service, for example, a viewer is not watching a content that is being offered with interest, it means that the service is not effectively offered or a value of the content being offered is low.

Therefore, in order to judge the effectiveness or the value of the service, it can be conceived to arrange a monitoring person that monitors the person that receives the service, but the arrangement of a monitoring person is a problem in terms of cost and also is a problem in that it may be physically impossible to arrange a monitoring person.

In the conventional service offering, the offering of the service has been performed regardless of whether the person receiving the service is concentrating on the offered service with interest. Therefore, in some cases, the intended object of the service offering is not achieved or the service is not effectively offered to a user.

Sometimes, for example, the user gets bored and loses interest in the content being offered or becomes interested in other things and stops watching the content being offered.

Even in those cases, the offered service is specified in advance by a service provider and the specified service continues to be offered. Therefore, the offering of the service is continued while the user has no interest.

SUMMARY OF THE INVENTION

Therefore, an object of an embodiment of the present invention is to provide an interest maintaining system capable of causing a user to concentrate on a content and continue watching the content.

An embodiment is an interest maintaining system, including: a terminal; and a server, the interest maintaining system being configured to maintain an interest of a user for the terminal, in which: the terminal includes: a first communication unit; a camera; an operation control unit configured to control a first operation in the terminal in accordance with data or an instruction from the server received via the first communication unit; and a transmission processing unit configured to perform processing of transmitting terminal usage situation data including image data acquired by being picked up by the camera to the server by the first communication unit; and the server includes: a second communication unit; an image analysis unit configured to perform image analysis on the image data received via the second communication unit and recognize the user that watches the terminal; an interest degree judgement unit configured to judge a gaze of the user recognized in the image analysis unit, and judge a degree of interest for the terminal based on the gaze; and an operation changing instruction transmission unit configured to transmit a changing instruction for causing the first operation in the terminal to be changed to a second operation to the terminal by the second communication unit when the degree of interest judged in the interest degree judgement unit is equal to or less than a predetermined threshold value.

DESCRIPTION OF EMBODIMENT

An embodiment is described below with reference to the drawings.
(Configuration)

The embodiment relates to a service offering system and particularly to an interest maintaining system for offering a childcare support service that offers a content to a terminal from a server.

Figure 1:
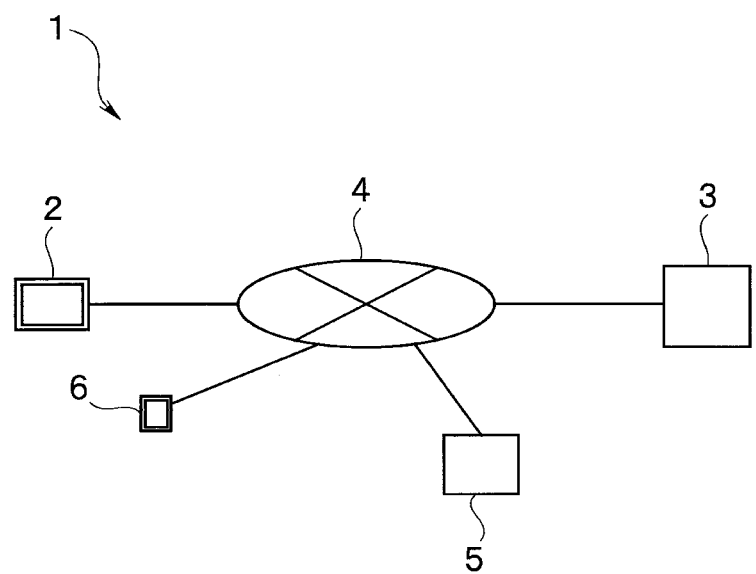
FIG. 1 is a configuration diagram of a childcare support service offering system 1 according to an embodiment.
Figure 2:
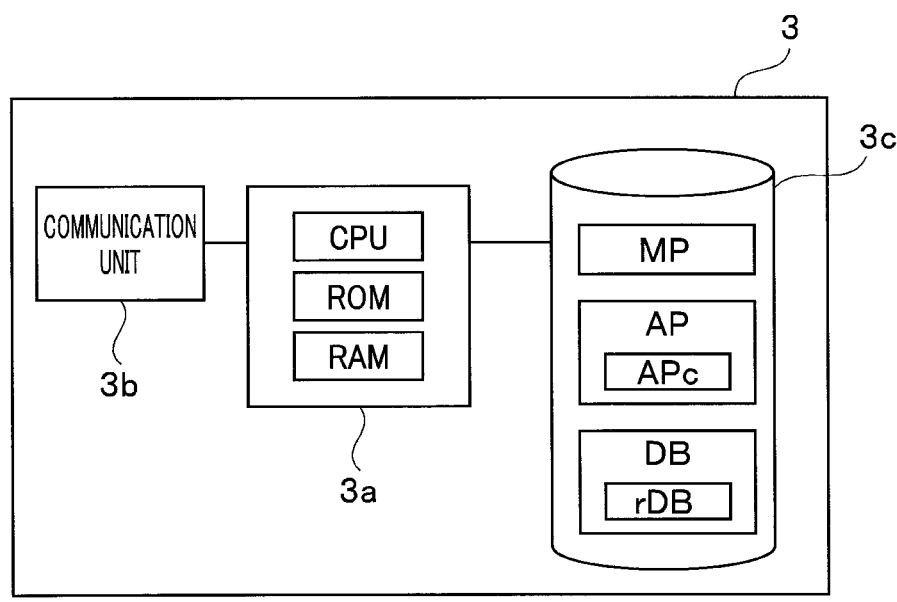
FIG. 2 is a block diagram illustrating a configuration of a server 3 according to the embodiment.
Figure 3:
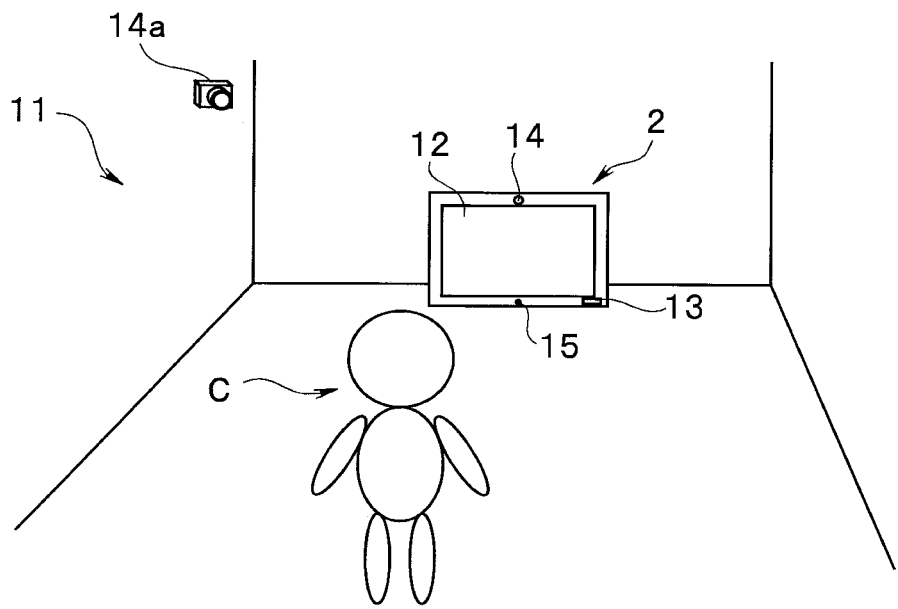
FIG. 3 is a view illustrating a terminal 2 that receives a service and an installing environment of the terminal 2 according to the embodiment.
Figure 4:
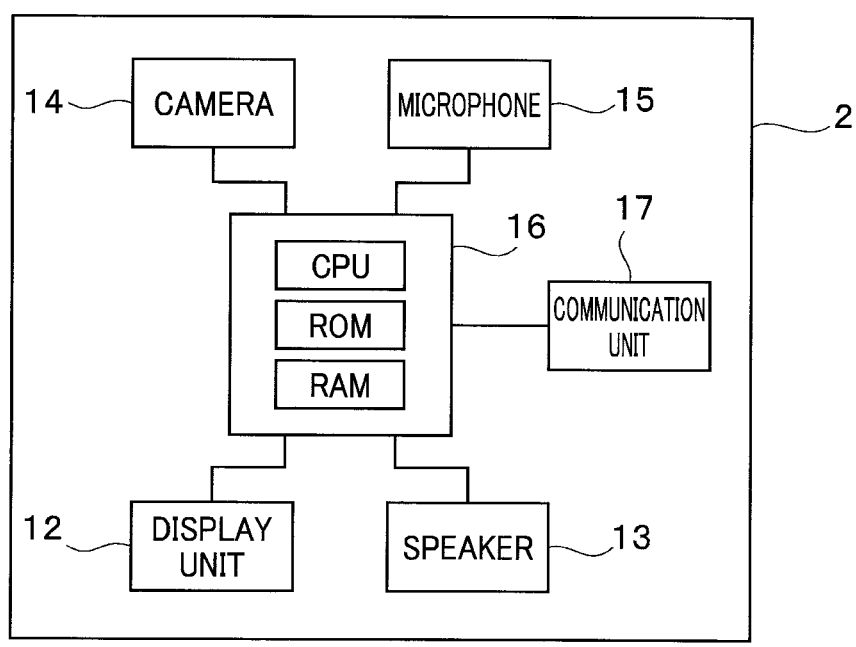
FIG. 4 is a block diagram illustrating a configuration of the terminal 2 according to the embodiment.

FIG. 1 is a configuration diagram of a childcare support service offering system 1 according to the embodiment. FIG. 2 is a block diagram illustrating a configuration of a server 3. FIG. 3 is a view illustrating a terminal 2 that receives the service and an installing environment of the terminal 2. FIG. 4 is a block diagram illustrating a configuration of the terminal 2.

As illustrated in FIG. 1, the childcare support service offering system (hereinafter simply referred to as a system) 1 is configured to include the terminal 2, the server 3, and a network 4 for communication between the terminal 2 and the server 3.

The terminal 2 is a terminal device having a communication function and capable of outputting a content received via the network 4 so as to be watchable by a user. The system 1 includes the terminal 2 and the server 3, and configures an interest maintaining system that maintains an interest of a child C that is the user of the terminal 2 as described below.

As illustrated in FIG. 2, the server 3 is a computer including a control unit 3a, a communication unit 3b, and a memory 3c, and is managed by a service provider that is offering the childcare support service. The control unit 3a includes a central processing unit (hereinafter referred to as a CPU), a ROM, a RAM, and the like. The control unit 3a controls the operation of the communication unit 3b, and performs the readout and writing of a program and data from the memory 3c.

In the memory 3c of the server 3, a media knowledge processing program MP and an application program AP are stored. The memory 3c includes a data base DB, and the data base DB stores various data necessary for the execution of various programs and various content data.

The media knowledge processing program MP is configured to include various software programs that perform media knowledge processing. The media knowledge processing program MP is a program for performing voice synthesis, conversation, translation, intention understanding, and the like by performing processing such as image recognition performed by image analysis, voice recognition performed by voice analysis, and the like on media data including voice data, image data, and text data.

The application program AP includes a plurality of service offering programs for a plurality of services offered by the server 3. The service offering program includes a program APc for the childcare support service. A program to be executed is selected out of the plurality of service offering programs in accordance with a service request from the user. The media knowledge processing program MP is executed in accordance with the request during the execution of the application program AP.

As described above, in the data base DB, a large amount of content data for various services is accumulated and a plurality of contents such as movies for children are stored herein for the childcare support service.

The data base DB includes attribute information for each content, and the attribute information is used when a content in accordance with the age, the sex, the preference, and the like of the user involved with the service request is selected.

Various types of rule information rDB used in a rule-based system described below is stored in the data base DB.

The service provider makes a contract with the user for each service to be offered, and offers the contracted service in accordance with a service request from each subscriber.

That is, the service provider signs a contract regarding the reception of the offering of the childcare support service with the user. When the server 3 receives a service request from the user that is a subscriber, the server 3 executes the program APc for offering the childcare support service in accordance with the received service request after authentication processing, reads out a predetermined content from the data base DB, and transmits the content data to the terminal 2 from the communication unit 3b via the network 4.

The network 4 is the Internet, for example. The terminal 2 of the user can access the server 3 via the network 4, and the server 3 can transmit the content data to the terminal 2 via the network 4 and receive various pieces of information such as image data from the terminal 2.

The terminal 2 of the user stores a program for the terminal for receiving the childcare support service from the server 3. The user can receive the childcare support service when the user activates the program for the terminal and performs a predetermined operation.

The childcare support service of the embodiment is used when, for example, a parent desires the child C to watch a content on the terminal 2 for a desired time amount, for example, 15 minutes and stay home without being particularly active for safety in order to run urgent errands. In the cases as above, the parent that is the user logs into the system of the server 3 in order to receive the childcare support service, and performs the service request.

As described below, the server 3 can notify a server 5 of another system and a smartphone 6 of the parent when a predetermined state or situation occurs while offering the service.

The server 5 is a server of a system that manages a plurality of dedicated staff members for the childcare support service. The server 5 includes a program that selects one member from the plurality of dedicated staff members and instructs the selected member to make a response that is instructed in a predetermined command when the server 5 receives the command from the server 3. The instruction to each member is performed by the transmission of an e-mail including the response instruction in accordance with the received command or the transmission of voice instruction information.

As illustrated in FIG. 3, the terminal 2 is installed by the parent at a position that can be seen by the child C in an indoor space 11 in which the child C as the user is present.

The terminal 2 is a tablet terminal having a thin plate-like shape, and includes a display unit 12 with a touch panel that can display a video, a speaker 13, a camera 14, and a microphone 15. The terminal 2 has a wireless communication function such as a wireless LAN, Wi-Fi, and the like. The terminal 2 is a tablet terminal herein, but may be a laptop computer or a dedicated device.

The user receives the childcare support service via the terminal 2. The childcare support service described in the embodiment below is a service that causes the child C to watch the content.

Information such as the age, the sex, the interest of the child C provided from the parent at the time of contract of the childcare support service is registered in the server 3. Therefore, candidates for the content appropriate for the child C as the user are extractable in the server 3.

As described above, the terminal 2 includes the display unit 12, the speaker 13, the camera 14, and the microphone 15. As illustrated in FIG. 4, the terminal 2 includes a control unit 16 and a communication unit 17 having a wireless communication function. The control unit 21 includes a CPU, a ROM, a RAM, and the like, and controls the operation of each device such as the display unit 12 and the speaker 13.

The display unit 12, the speaker 13, the camera 14, the microphone 15, and the communication unit 17 are connected to the control unit 16. By executing a program stored in the ROM, the control unit 16 executes various kinds of processing, outputs a driving signal and the like to peripheral devices such as the display unit 12, and receives an input signal and the like from each of the peripheral devices.

A program for the terminal for receiving various services of the server 3 is stored in the ROM of the control unit 16. The control unit 16 executes the program for the terminal for various services such as the childcare support service of the server 3 in accordance with the instruction input from the user, for example, the instruction input to the display unit 12 with the touch panel.

Note that the program for the terminal may be downloaded from the server 3.

The childcare support service of the embodiment is a service in which the terminal 2 is caused to take care of the child C. More specifically, the server 3 that is a center apparatus transmits the content data that the child C is interested in to the terminal 2. The content that the child C is interested in is displayed on the terminal 2, and hence the child C stays still and watches the content. The parent can finish housework and errands while the child C is watching the content on the terminal 2. When the child C gets bored with the content displayed on the terminal 2 and the degree of interest of the child C for the content decreases, the server 3 changes contents to an interesting one to the child C.

When the child C is considered to be in a state of not watching the content, for example, a predetermined person in charge makes a response for the child C in place of the terminal 2 by talking to the child C that had been watching the content on the terminal 2 or transmitting an e-mail to the parent.

Therefore, when the user desires to cause the terminal 2 to take care of the child C, the user performs a childcare support service offering request to the server 3.

Figure 5:
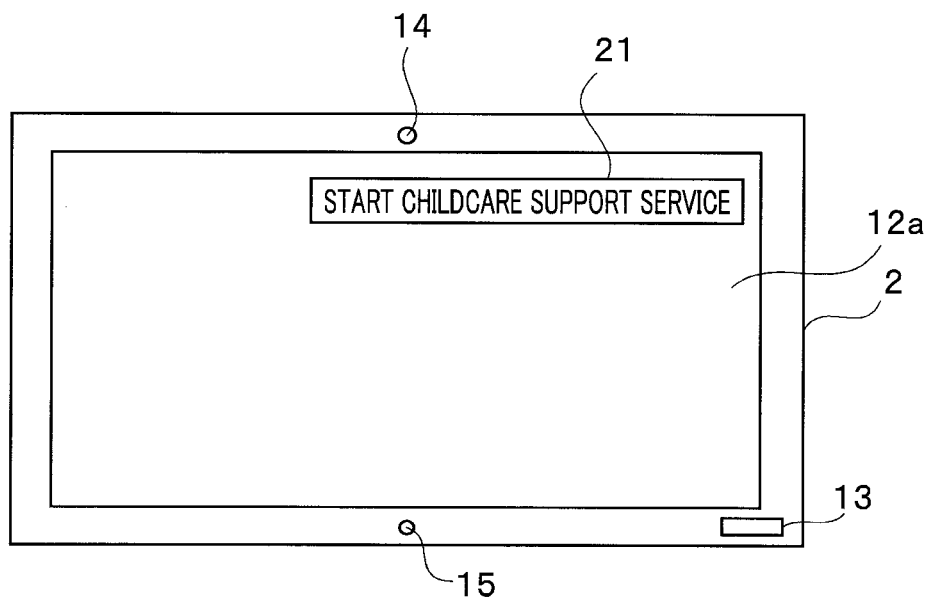
FIG. 5 is a view illustrating a display example of a screen of the terminal 2 according to the embodiment.

FIG. 5 is a view illustrating a display example of the screen of the terminal 2.

When the parent of the child C that is the user desires to receive the offering of the childcare support service, the parent activates the program for the terminal for receiving the childcare support service. When the program for the terminal is executed, a predetermined button 12b displayed as "start childcare support service" is displayed on a screen 12a of the display unit 12, and the button 12b is touched. That is, the user can perform the request for the childcare support service offering to the server 3 by causing the program for the terminal to be executed and touching the predetermined button 12b.

When the button 12b is touched, a service offering request, that is, the request for the offering of the childcare support service herein is transmitted from the terminal 2 to the server 3. The service offering request from the terminal 2 includes identification information, for example, a user ID for determining the user.

Figure 6:
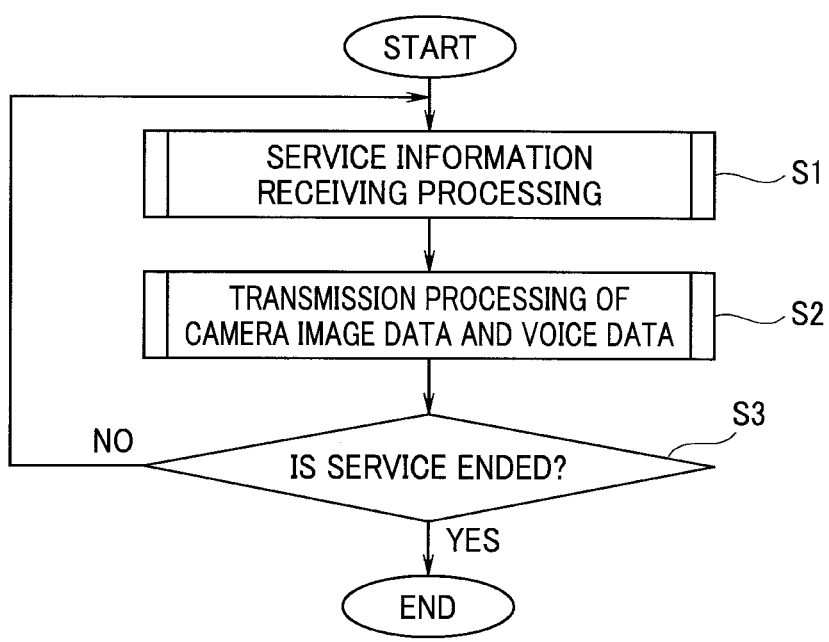
FIG. 6 is a flowchart illustrating an example of a flow of processing of a program for a terminal of the terminal 2 according to the embodiment.

FIG. 6 is a flowchart illustrating an example of a flow of processing of the program for the terminal of the terminal 2. The terminal 2 executes the processing in FIG. 6 after transmitting the request for the offering of the childcare support service to the server 3.

The server 3 transmits the content data to the terminal 2 in accordance with the service offering request from the terminal 2 of the user, and hence the terminal 2 executes service information receiving processing (Step (hereinafter abbreviated to S) 1). The service information is data of a video content.

By the service information receiving processing, the terminal 2 decodes the content data and performs an operation of displaying the video of the content on the screen 12a of the display unit 12 and outputting the voice of the content from the speaker 13.

That is, the control unit 16 configures an operation control unit that controls the output operation of the content in the terminal 2 in accordance with the data from the server 3 received via the communication unit 17.

As a result, the child C can watch the content with use of the terminal 2.

The terminal 2 performs service information receiving processing and transmission processing of camera image data and voice data (S2). The camera image data is generated from an imaging signal acquired by being picked up by the camera 14, and the voice data is generated from a voice signal acquired in the microphone 15. The camera 14 can acquire the image of the child C watching the screen 12a, and the microphone 15 can collect the voice of the child C watching the screen 12a or ambient sound. The camera image data and the voice data are data indicating the usage situation of the terminal 2. Therefore, the control unit 16 configures a transmission processing unit that performs processing of transmitting terminal usage situation data including the image data acquired by being picked up by the camera 14 and the voice data acquired by the microphone 15 to the server 3 by the communication unit 17.

By the transmission processing of the camera image data and the voice data, the image data of a face of the child C watching the content and the voice data such as the voice of the child C are transmitted to the server 3.

The user can cause the service to end while the user is receiving the service information. In the terminal 2, the ending of the service is judged in accordance with whether a service ending instruction is given by the user or whether the service offering from the server 3 is ended. The ending of the service during the reception of the service information can be performed when the child C or the parent that is the user touches a predetermined button on the screen. The ending of the service offering from the server 3 is automatically judged in the terminal 2 based on the reception situation of the content data and the like.

Therefore, the judgement processing of the ending of the service is performed (S3) together with the processing of the service information receiving processing (S1) and the transmission processing (S2) of the camera image data and the voice data.

When it is judged that the service is ended (S3: YES), the processing ends.

When it is not judged that the service is ended (S3: NO), the processing returns to S1, and the processing in S1 and S2 is continuously performed.

The processing of receiving the content data from the server 3 and the processing of transmitting the camera image data and the voice data are continuously performed in the terminal 2 until it is judged that the service is ended.

Figure 7:
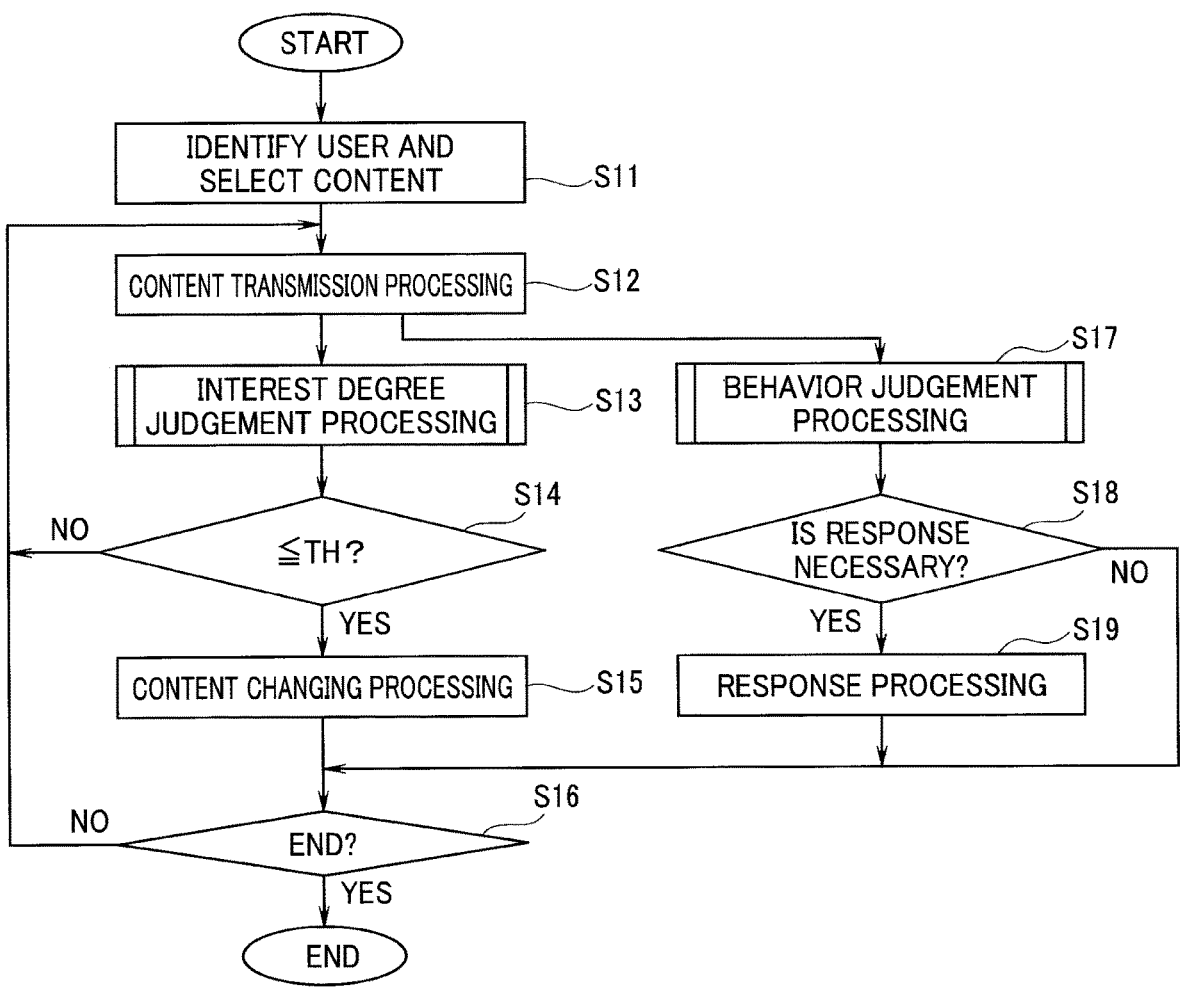
FIG. 7 is a flowchart illustrating an example of a flow of service information offering processing in a server according to the embodiment.

FIG. 7 is a flowchart illustrating an example of a flow of service information offering processing in the server. The processing in FIG. 7 is executed when the service offering request is received from the terminal 2. The processing in FIG. 7 is processing of the program APc for the childcare support service that is read out from the memory 3c and executed by the CPU 3a.

When the server 3 receives the service offering request from the terminal 2, the server 3 identifies the user from the identification information of the user, and selects a content from the data base based on information such as the preference registered in advance for the child C as the user (S11).

More specifically, when the server 3 receives the service offering request from the terminal 2, the server 3 identifies the user from the identification information of the user. Then, the server 3 extracts a plurality of contents, the degree of interest for the child C of which is conceived to be high, from a large quantity of contents included in the data base DB based on the information such as the preference of the identified child C. Then, an order is applied to the plurality of extracted contents. The plurality of contents offered to the terminal 2 from the server 3 and the order of the offering of each of the contents are set as a scenario of the offering of the contents. Therefore, as described below, when the content is changed, the contents are selected in the order in the scenario and the selected content is offered to the terminal 2.

As described above, also the attribute information for each content is stored in the data base DB in advance, and hence the content on which the child C is estimated to have the most interest is selected first based on the attribute information.

The server 3 executes content transmission processing for transmitting the read out content data to the terminal 2 (S12).

The server 3 executes interest degree judgement processing for judging the degree of interest of the child C as the user watching the transmitted content (S13).

The interest degree judgement processing is described with reference to FIG. 8.

Figure 8:
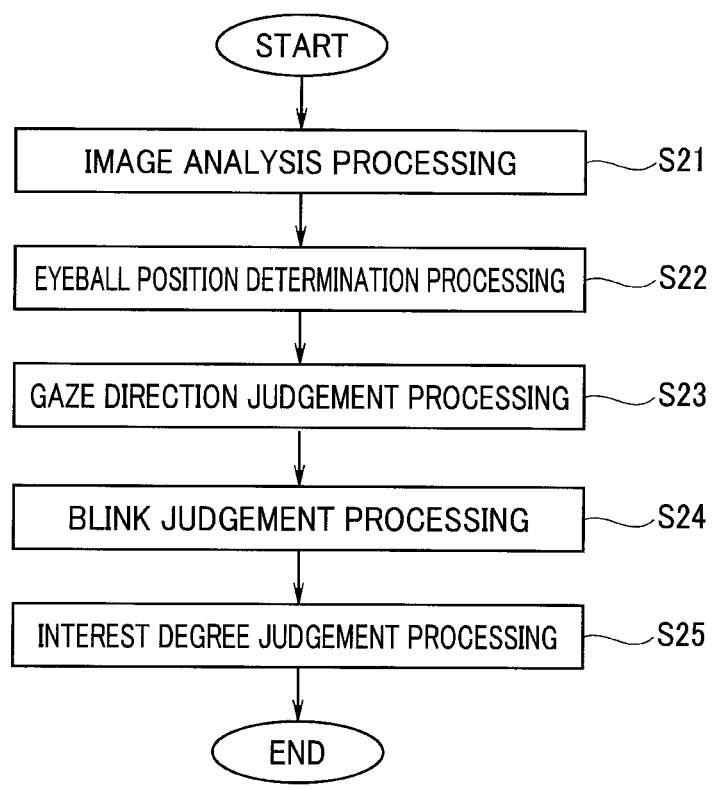
FIG. 8 is a flowchart illustrating an example of a flow of interest degree judgement processing according to the embodiment.

FIG. 8 is a flowchart illustrating an example of a flow of the interest degree judgement processing.

The image data and the voice data are transmitted to the server 3 from the terminal 2 of the user in real time. Therefore, the server 3 executes image analysis, voice analysis, and the like with use of the media knowledge processing program MP.

First, the server 3 executes image analysis processing (S21). In the image analysis processing, recognition of a person, face recognition of a person, and the like are performed. The processing in S21 is executed by the media knowledge processing program MP. That is, the processing in S21 configures an image analysis unit that performs image analysis on the image data received via the communication unit 3b and recognizes the child C that is the user watching the terminal 2.

Next, the server 3 executes eyeball position determination processing for determining positions of eyeballs from a face of the person recognized in image recognition processing (S22). The positions of the eyeballs can be acquired from the image information on the face recognized by face recognition processing, and the positions of two eyes on the face are determined.

Subsequently, the server 3 executes gaze direction judgement processing for judging the gaze direction of the person recognized in the image recognition processing (S23). The judgement of the gaze direction is performed based on the image of the face of the person recognized in the face recognition processing and the information on the positions of the two eyes determined in the eyeball positions determination processing.

The server 3 executes blink judgement processing for judging the blink of the eye of the person recognized in the image recognition processing (S24).

Then, the server 3 executes interest degree judgement processing for judging the degree of interest of the child C as the user watching the content on the terminal 2 from information on the eyeball positions, the gaze direction, and the blink recognized or judged in S21 to S24 (S25).

In the embodiment, the judgement of the degree of interest is performed based on whether the eyeball positions cannot be recognized due to the child C turning around and stopping watching the terminal 2, whether the gaze direction is not in the direction of the display unit 12 of the terminal 2, or whether the time period in which the eyes are closed increases.

That is, the degree of interest is defined in accordance with the length or the rate of the time period in which the gaze is toward the terminal 2 for every predetermined time period.

Therefore, the processing in S25 configures an interest degree judgement unit that judges the gaze of the user, that is, the gaze direction, and judges the degree of interest for the terminal 2 based on the gaze.

For example, it is judged every few seconds whether at least one state out of the abovementioned states, that is, the state in which the eyeball positions cannot be recognized, the state in which the gaze direction is not in the direction of the terminal 2, or the state in which the time period in which the eyes are closed increases has occurred. As the time period in which those states continue increases, the time period in which the child C is not watching the terminal 2 increases. When the time period of not watching the terminal 2 increases, it means that the degree of interest of the child C for the content is low.

In the embodiment, the degree of interest is defined as the time period in which the user, that is, the child C herein is watching the content for every predetermined time period. The degree of interest is expressed herein by the rate of the time period in which the child C is watching the content for every predetermined time period.

Note that the degree of interest is herein quantified by defining the degree of interest as the rate of the time period in which the user, that is, the child C herein is watching the content for every predetermined time period, but may be quantified with use of other functions.

Returning to FIG. 7, the server 3 judges whether the degree of interest judged in S13 is equal to or less than a predetermined threshold value TH (S14). In the description below, a moving average value of the degree of interest is expressed by a degree of interest INT.

Figure 9:
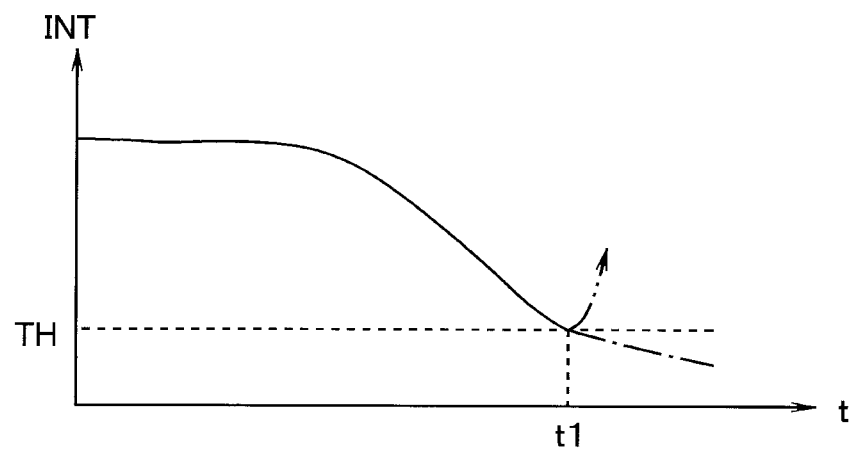
FIG. 9 is a graph showing a change in a degree of interest according to the embodiment.

FIG. 9 is a graph showing a change in the degree of interest.

In FIG. 9, a vertical axis corresponds to a degree of interest INT and a horizontal axis corresponds to a time t. As illustrated in FIG. 9, the degree of interest INT is high immediately after the content is transmitted, but the degree of interest INT decreases as the time t elapses and becomes equal to or less than the threshold value TH at a time point t1.

When the degree of interest INT is not equal to or less than the threshold value TH (S14: NO), the processing returns to S12.

When the degree of interest INT is equal to or less than the threshold value TH (S14: NO), the server 3 executes the content changing processing (S15). The processing in S15 is processing of changing the content to be transmitted to another content that is different from the content that is currently selected and transmitted. The processing is performed in order to enhance the degree of interest of the child C by changing the content because the degree of interest of the child C for the currently transmitted content has decreased. In S15, a content that is next to the currently transmitted content in order is selected.

Subsequently, the server 3 judges whether the service is ended due to the ending instruction from the parent of the child C that is the user or the ending of the transmission of the content (S16).

When the service is not ended (S16: NO), the processing returns to S12, and transmission processing of the content changed in S15 is performed. When the content is changed by the processing in S15, the child C may become interested in the new content.

When the child C shows interest in the changed content, the degree of interest INT rises as illustrated by a two-dot chain line in FIG. 8.

Therefore, when the degree of interest INT becomes equal to or less than the predetermined threshold value TH, the content next to the currently transmitted content in order set in the scenario is selected and transmitted. Thus, the degree of interest INT of the child is maintained to be equal to or more than the predetermined threshold value TH.

When the service is ended (S16: YES), the processing ends.

Note that the server 3 may cause the server 5 managing the dedicated staff to transmit a live video of a dedicated staff member in charge instead of changing the content to be transmitted in the order of the scenario set in advance in the content changing processing in S15.

As described above, the processing in S15 configures an operation changing instruction transmission unit that transmits a changing instruction for causing an output operation of the content in the terminal 2 to be changed to an operation of outputting another content or outputting a content of a live video to the terminal 2 by the communication unit 3b when the degree of interest INT judged in S13 becomes equal to or less than the predetermined threshold value TH.

After S12, response processing based on behavior judgement performed by processing from S17 to S19 is executed in parallel with the content changing processing based on the interest degree judgement performed by the processing from S13 to S15. The response processing is performed herein with use of the rule-based system.

First, the server 3 executes behavior judgement processing (S17).

Figure 10:
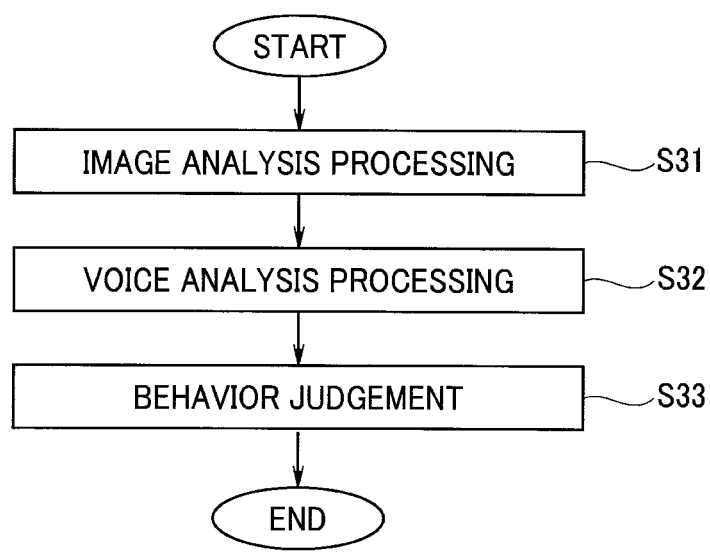
FIG. 10 is a flowchart illustrating an example of a flow of behavior judgement processing according to the embodiment.

FIG. 10 is a flowchart illustrating an example of a flow of the behavior judgement processing.

The processing in FIG. 10 is performed with use of the media knowledge processing program MP.

First, the server 3 executes the image analysis processing (S31). In the image analysis processing in S31, analysis processing for recognition of a person, motion recognition of a person, and the like is executed.

The server 3 executes voice analysis processing (S32). In the voice analysis processing in S32, analysis processing for voice recognition of a person, estimation of an object that has produced a sound, and the like is executed.

Then, the server 3 performs the behavior judgement with use of the results of the analysis processing in S31 and S32 (S33).

In the behavior judgement in S33, a behavior of the child C that is the user is judged by executing estimation processing of the gaze direction as described in S23, the blink as described in S24, and the like of the motion of the child C from the image analysis result in S31 and executing estimation processing of the voice of the child C, a volume of the voice, and the like from the voice analysis result in S32.

Note that sound analysis information acquired by analyzing the voice data is generated in voice analysis processing. The sound analysis information includes information on words spoken by a person, an intention of the person obtained from the words, and the like and information on an object that has produced a sound.

Returning to FIG. 7, the server 3 judges whether a predetermined action needs to be taken, that is, whether a response is necessary based on the result of the behavior judgement processing in S17 (S18).

When the response is necessary (S18: YES), the server 3 executes response processing for executing the predetermined action (S19).

The processing in S18 and S19 is herein processing using the rule-based system. The rule-based system designates the action of the processing to be executed with reference to the rule information rDB stored in the memory 3c.

The existence of a predetermined event is judged from the behavior or the state of the child C judged by the behavior judgement in S33, and each rule is judged to be true or false in accordance with whether one or two or more predetermined events occur.

In the rule-based system, one or at least two rules and actions corresponding to cases where the respective rules are true are defined in advance. Each rule is defined in accordance with whether one or at least two events occur. That is, each action is processing executed when one or at least two predetermined events occur (that is, when true). That is, the predetermined action is executed when a predetermined rule is judged to be true.

When an event occurs, the event is stored in the memory 3c as log data. When the predetermined rule is judged to be true, it is judged that the predetermined event has occurred.

The server 3 judges whether the response is necessary by judging whether a rule that is true exists in the plurality of predetermined rules (S18). When it is judged that response is necessary (S18: YES), the server 3 executes the response processing (S19). The response processing is processing of executing the action set in advance for the rule that is true.

Note that the processing proceeds to S16 when it is not judged that the response is necessary (S18: NO).

A problem does not occur even when the gaze of the child C is away from the terminal 2 for a while if the gaze immediately returns to the terminal 2. However, for example, when it is judged that the degree of interest INT continues to decrease as illustrated in a one dot chain line in FIG. 9 even after the degree of interest INT becomes equal to or less than the predetermined threshold value TH and the content is changed, the server 3 transmits an e-mail to the predetermined dedicated staff of the server 5 and instructs the predetermined dedicated staff to directly make a response. That is, as one rule, a rule for when an event in which the degree of interest INT continues to decrease occurs after an event in which the degree of interest INT becomes equal to or less than the predetermined threshold value TH and the content is changed is defined. When the rule is true (S18: YES), the server 3 transmits an e-mail for instructing the dedicated staff to make direct response to the server 5, and transmits a command for causing a live video of the dedicated staff from a camera provided on a personal computer of the dedicated staff to be transmitted to the terminal 2 from the personal computer of the dedicated staff to the server 5. As a result, the content of the live video of the dedicated staff is displayed on the screen of the terminal 2.

When it is judged that the degree of interest INT is equal to or less than the predetermined threshold value TH and an appearance of the child C has disappeared from the image by the image analysis, the server 3 transmits an emergency e-mail to the smartphone 6 of the parent and tells the parent that the child C is not watching the content on the terminal 2. That is, as one rule, a rule for when an event in which the degree of interest INT is equal to or less than the predetermined threshold value TH and an event in which the appearance of the child C is not in the image of the camera 14 simultaneously occur is defined. An action in which the server 3 transmits an e-mail including a predetermined message, for example, a message of "your child is not watching the terminal" to the smartphone 6 of the parent when the rule is true (S18: YES) is defined.

When it is judged that the gaze of the child C is not toward the terminal 2 and the child C is continuing to emit a large voice for a predetermined time period or more by the image analysis, the server 3 transmits an e-mail to a predetermined dedicated staff of the server 5 and instructs the predetermined dedicated staff to directly make a response. That is, as one rule, a rule for when an event in which the gaze of the child C is not toward the terminal 2 and an event in which the child C is continuing to emit a large voice for a predetermined time period or more simultaneously occur is defined. An action in which the server 3 transmits an e-mail for instructing the dedicated staff to make a direct response to the server 5 when the rule is true (S18: YES) is defined.

When the number of times the child C blinks decreases and the motion of the child C decreases in accordance with the image analysis, the child C is conceived to be sleepy. Thus, the server 3 transmits a command for reducing a sound volume level of the transmitted content to the terminal 2. That is, as one rule, a rule for when an event in which the number of times the child C blinks is decreasing and an event in which the motion of the child C is decreasing simultaneously occur in accordance with the image analysis is defined, and an action in which the server 3 transmits a command for reducing the sound volume level of the transmitted content to the terminal 2 when the rule is true (S18: YES) is defined.

As described above, the processing in S17 configures an event judgement unit that judges whether the predetermined event has occurred based on the image data and the voice data. Note that whether the predetermined event has occurred may be judged simply by the image data. The processing in S18 and S19 configures a notification unit that transmits a predetermined notification when it is judged that the predetermined event has occurred by S17.

A notification for instructing the server 5 to switch the content displayed on the terminal 2 to the live video of the dedicated staff is also included in the predetermined notification. That is, the predetermined notification is a notification for the server 5 for causing the server 5 that is a predetermined apparatus to perform processing of changing the operation in the terminal 2 to another operation. As a result, for example, when the appearance of the child C cannot be seen in the image data while the video content is displayed on the terminal 2 or the degree of interest INT does not become equal to or more than the predetermined threshold value TH even when the video content is changed, the server 5 and the terminal 2 can be caused to perform the processing of causing the display on the display unit 12 to be changed from the content to the live video of the dedicated staff.

The rules and the actions described above are examples. Other than the above, an action in accordance with the degree of interest of the user or an action based on the offering of the service can be performed for the user by defining a plurality of rules for occurrence patterns of one or at least two events and a plurality of actions in accordance with the respective rules in the server 3.

By incorporating the rule-based system as above in the media knowledge processing program MP or the application program AP of the server 3 in advance, the server 3 judges the degree of interest INT of the user for the terminal 2 and detects the occurrence of various events, that is, judges the behavior (S17) from the image data and the voice data acquired in the terminal 2. When the predetermined rule is true (S18: YES), the server 3 executes the action specified in advance that corresponds to the rule (S19).

The processing proceeds to S16 after the processing in S19.

When the degree of interest INT does not become equal to or less than the predetermined threshold value TH (S14: NO) and none of the rules becomes true (S18: NO) as a result of changing the content, the child C is continuing to watch the content with interest.

Note that in the offering of the content in the childcare support service, a time limit, that is, a maximum time period of a continuous offering time period of the content is provided in advance, and the child C is prevented from becoming too obsessed with the video content.

When the content such as a movie ends or the viewing of the content is interrupted, an end message or an ending notice message such as "let's play with mom next" may be output through voice so that the child C does not cry due to the child C suddenly not being able to watch the content.

As described above, when the user requests the childcare support service, the server 3 transmits the content that the child C is interested in to the terminal 2 in accordance with the request.

The server 3 monitors the gaze of the child C watching the content during the content offering based on the image data of the camera 14 on the terminal 2 and judges the degree of interest INT of the child C for the content based on the gaze.

When the degree of interest INT decreases and becomes equal to or less than the predetermined threshold value TH, another content is transmitted in order to enhance the degree of interest INT of the child C.

The server 3 judges situations such as a case where the degree of interest INT of the child C does not increase even when the content is changed, a case where the child C suddenly leaves the terminal 2, and a case where the child C becomes noisy.

The server 3 notifies or instructs the server 5 of another system that manages contact with the dedicated staff for the childcare support in order to contact the dedicated staff, or notifies the smartphone 6 of the parent in order contact the parent of the child C in accordance with the situation.

Note that the smartphone 6 of the parent of the child C is notified in the abovementioned embodiment, but a person other than the parent such as a manager of a condominium may be registered in the server 3 in advance as contact information and a person other than the parent may be contacted.

Therefore, the child C can be caused to concentrate on the terminal 2 and watch the content by monitoring the degree of interest INT based on the gaze of the child C and changing the content when the degree of interest INT decreases.

When situations such as a situation in which the degree of interest INT continues to decrease or a situation in which the child C leaves the terminal occur, the dedicated staff or the parent is contacted. Therefore, the childcare support service can be received while enhancing safety.

In the abovementioned embodiment, the image of the child C acquired only by the camera 14 on the terminal 2 and the image data is transmitted to the server 3. However, as illustrated in FIG. 3, another camera 14a that picks up images of the child C may be provided in the indoor space 11 and the behavior of the child C may be judged from two videos acquired by the two cameras 14 and 14a.

Application examples of the abovementioned embodiment are described.

The offered service in the abovementioned embodiment is a childcare support service that attracts the interest of the child C by showing the video content to the child C with use of the terminal 2 such as the tablet terminal, but the terminal 2 only needs to attract the interest of the child C even by means other than showing the video content and the like, and hence may be a robot.

Figure 11:
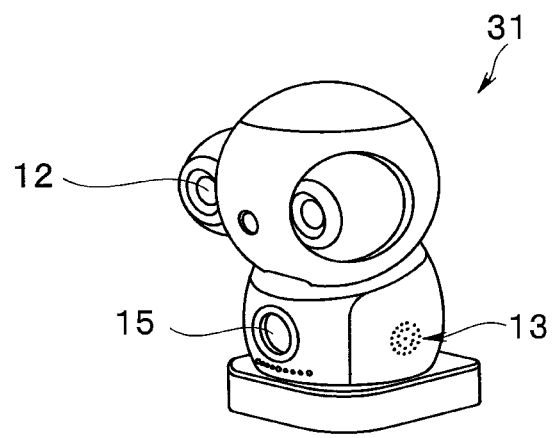
FIG. 11 is an external view of a robot according to the embodiment.

FIG. 11 is an external view of the robot. A robot 31 includes elements as illustrated in FIG. 4, and also includes the control unit 16, the speaker 13, the camera 14, the microphone 15, and the like.

When the terminal 2 is the robot 31, the server 3 transmits conversation data to the robot. The child C watches the talking robot 31 with interest. At the time, the server 3 judges the gaze from the image of the child C by the camera 14 provided on the robot.

The robot 31 may be a robot that can move arms and the like in order to attract the interest of the child C. That is, the robot 31 may be able to move hands and the like of the robot 31 or output voice as an operation of the robot 31.

As described above, the degree of interest INT is judged from the gaze. When the degree of interest INT becomes equal to or less than the predetermined threshold value TH, the child C can be caused to concentrate on the robot that is the terminal 2 by transmitting conversation data on another topic. If the robot can move arms and the like, the server 3 transmits another motion data to the robot 31 when the degree of interest INT becomes equal to or less than the predetermined threshold value TH.

That is, the control unit 16 of the robot 31 configures an operation control unit that controls the operation in the robot 31 in accordance with the motion data or the instruction of the operation from the server 3 received via the communication unit 17.

When situations such as a situation in which the degree of interest INT continues to decrease or a situation in which the child C leaves the robot 31 that is the terminal occur, the dedicated staff or the parent is contacted. Therefore, the childcare support service can be received in a safe manner.

Note that the service using the robot as above can be applied to a case where the robot is used for rehabilitation in nursing facilities and the like.

The terminal of the abovementioned embodiment is the terminal 2 including the display unit or the robot in the abovementioned example, but the interest of the child C only needs to be attracted, and hence the terminal may be a household electric appliance such as a vacuum cleaner that self-travels on a floor.

Figure 12:
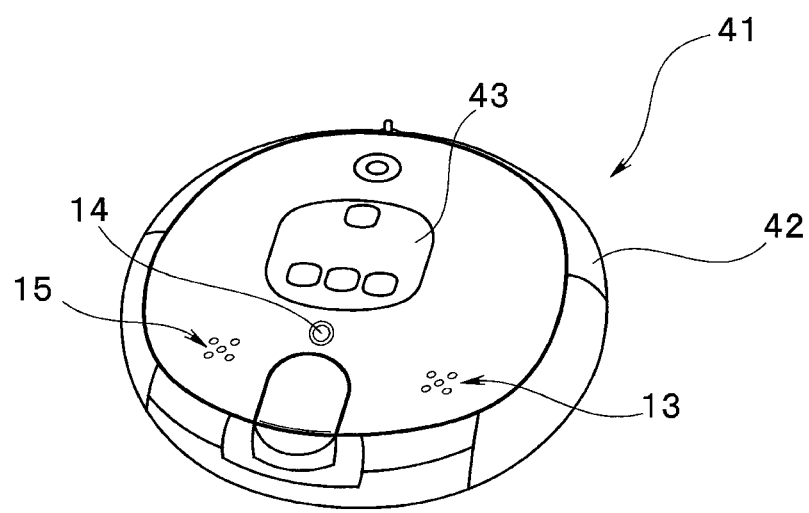
FIG. 12 is an external view of a vacuum cleaner that is a household electric appliance according to the embodiment.

FIG. 12 is an external view of a vacuum cleaner that is an example of a household electric appliance.

A vacuum cleaner 41 is a so-called robot vacuum cleaner that self-travels in a room and sucks trash on a floor surface. In a main body 42, the elements as illustrated in FIG. 4 are included, and the control unit 16, the speaker 13, the camera 14, the microphone 15, and the like are mounted. The vacuum cleaner 41 can perform movement of the vacuum cleaner itself and output voice.

When the terminal 2 is the vacuum cleaner 41, the server 3 transmits conversation data and motion data to the vacuum cleaner 41. The child C watches the talking and moving vacuum cleaner 41 with interest. At the time, the server 3 judges the gaze from the image of the child C by the camera provided on the vacuum cleaner 41.

As described above, the degree of interest INT is judged from the gaze. When the degree of interest INT becomes equal to or less than the predetermined threshold value TH, the child C can be caused to concentrate on the vacuum cleaner 41 that is the terminal 2 by transmitting conversation data on another topic or another motion data.

That is, the control unit 16 of the vacuum cleaner 41 configures an operation control unit that controls the operation in the vacuum cleaner 41 in accordance with the motion data or the instruction of the operation from the server 3 received via the communication unit 17.

When situations such as a situation in which the degree of interest INT continues to decrease or a situation in which the child C leaves the vacuum cleaner 41 that is the terminal occur, the dedicated staff or the parent is contacted. Therefore, the childcare support service can be received in a safe manner.

As another application example, the terminal 2 only needs to attract the interest of the child C, and hence may be a computer for a remote education system. For example, the server 3 transmits content data of a lecture to a personal computer that is the terminal 2 with use of a network, displays a video of the lecture on the display unit of the terminal 2, outputs voice from the speaker, and acquires an image of the user that is a student by the camera 14 on the terminal 2.

In the case, the degree of interest INT of the user is judged from the gaze of the user, and the user can be caused to concentrate on the terminal 2 by transmitting another lecture content data when the degree of interest INT becomes equal to or less than the predetermined threshold value TH.

When situations such as a situation in which the degree of interest INT continues to decrease or a situation in which the user leaves the terminal occur, the dedicated staff or the parent is contacted.

As described above, according to the abovementioned embodiment and the application examples, the interest maintaining system capable of causing the user to concentrate on the content and continue watching the content can be provided.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An interest maintaining system, comprising:
a terminal; and
a server,
the interest maintaining system being configured to maintain an interest of a user for the terminal, wherein:
the terminal comprises:
a first communication unit;
a camera;
an operation control unit configured to control a first operation in the terminal in accordance with data or an instruction from the server received via the first communication unit; and
a transmission processing unit configured to perform processing of transmitting terminal usage situation data comprising image data acquired by being picked up by the camera to the server by the first communication unit; and
the server comprises:
a second communication unit
a face recognition unit configured to perform image analysis on the image data received via the second communication unit and recognize a face of the user that watches the terminal;
an eyeball position determination unit configured to determine positions of two eyeballs from an image of the face of the user recognized in the face recognition unit;
a gaze direction judgement unit configured to judge a gaze direction of the user based on the image of the face recognized in the face recognition unit and information on the positions of the two eyeballs determined in the eyeball position determination unit;
a blink judgement unit configured to judge a blink of an eye of the user recognized in the face recognition unit;
an interest degree judgement unit configured to judge a degree of interest for the terminal based on the determined positions of the two eyeballs, the judged gaze direction, and the judged blink of the eye; and
an operation changing instruction transmission unit configured to transmit a changing instruction for causing the first operation in the terminal to be changed to a second operation to the terminal by the second communication unit when the degree of interest judged in the interest degree judgement unit is equal to or less than a predetermined threshold value.

2. The interest maintaining system according to claim 1, wherein the degree of interest is defined by a length or a rate of a time period in which the gaze is toward the terminal for every predetermined time period.

3. The interest maintaining system according to claim 1, wherein the server comprises:
an event judgement unit configured to judge whether a predetermined event occurs based on the image data; and
a notification unit configured to transmit a predetermined notification when it is judged by the event judgement unit that the predetermined event occurs.

4. The interest maintaining system according to claim 3, wherein:
the terminal comprises a microphone;
the usage situation data comprises voice data acquired by the microphone; and
the event judgement unit judges whether the predetermined event occurs based on the image data and the voice data received via the second communication unit.

5. The interest maintaining system according to claim 3, wherein the predetermined notification is a notification for a predetermined apparatus for causing the predetermined apparatus to perform processing of changing the first operation or the second operation in the terminal to a third operation.

6. The interest maintaining system according to claim 1, wherein:
the terminal comprises a display unit configured to display a video;
the first operation is an operation of displaying a first video content on the display unit; and
the second operation is an operation of displaying a second video content on the display unit.

7. The interest maintaining system according to claim 6, wherein the first video content and the second video content are transmitted from the server.

8. The interest maintaining system according to claim 1, wherein:
the terminal is a robot; and
the first operation and the second operation are a motion or a voice output of the robot.

9. The interest maintaining system according to claim 1, wherein:
the terminal is a vacuum cleaner configured to self-travel on a floor; and
the first operation and the second operation are a motion or a voice output of the vacuum cleaner.

10. A server for an interest maintaining system,
the interest maintaining system being configured to maintain an interest of a user for a terminal,
the server comprising:
a communication unit;
a face recognition unit configured to perform image analysis on an image data from the terminal received via the communication unit and recognize a face of the user that watches the terminal;
an eyeball position determination unit configured to determine positions of two eyeballs from an image of the face of the user recognized in the face recognition unit;
a gaze direction judgement unit configured to judge a gaze direction of the user based on the image of the face recognized in the face recognition unit and information on the positions of the two eyeballs determined in the eyeball position determination unit;
a blink judgment unit configured to judge a blink of an eye of the user recognized in the face recognition unit;
an interest degree judgement unit configured to judge a degree of interest for the terminal based on the determined positions of the two eyeballs, the Judged gaze direction, and the judged blink of the eye; and
an operation changing instruction transmission unit configured to transmit a changing instruction for causing a first operation in the terminal to be changed to a second operation to the terminal by the communication unit when the degree of interest judged in the interest degree judgement unit is equal to or less than a predetermined threshold value.

11. The server according to claim 10, wherein the degree of interest is defined by a length or a rate of a time period in which the gaze is toward the terminal for every predetermined time period.

12. The server according to claim 10, wherein the server comprises:
an event judgement unit configured to judge whether a predetermined event occurs based on the image data; and
a notification unit configured to transmit a predetermined notification when it is judged by the event judgement unit that the predetermined event occurs.

13. The server according to claim 12, wherein the event judgement unit judges whether the predetermined event occurs based on the image data and voice data received via the communication unit.

14. The server according to claim 12, wherein the predetermined notification is a notification for a predetermined apparatus for causing the predetermined apparatus to perform processing of changing the first operation or the second operation in the terminal to a third operation.

15. An interest maintaining system comprising:
a terminal, and
a server;
the interest maintaining system being configured to maintain an interest of a user for the terminal, wherein
the terminal comprises:
a first communication unit;
a camera;
a microphone;
an operation control unit configured to control a first operation in the terminal in accordance with data or an instruction from the server received via the first communication unit; and
a transmission processing unit configured to perform processing of transmitting image data acquired by being picked up by the camera and voice data acquired by the microphone to the server by the first communication unit;
and the server comprises:
a second communication unit;
a face recognition unit configured to perform image analysis on the image data received via the second communication unit and recognize a face of the user that watches the terminal;
an eyeball position determination unit configured to determine positions of two eyeballs from an image of the face of the user recognized in the face recognition unit;
a gaze direction judgement unit configured to judge a gaze direction of the user based on the image of the face recognized in the face recognition unit and information on the positions of the two eyeballs determined in the eyeball position determination unit;
a blink judgement unit configured to judge a blink of an eye of the user recognized in the face recognition unit;
an interest degree judgement unit configured to judge a degree of interest for the terminal based on the determined positions of the two eyeballs, the judged gaze direction, and the judged blink of the eye;
an operation changing instruction transmission unit configured to transmit a changing instruction for causing the first operation in the terminal to be changed to a second operation to the terminal by the second communication unit when the degree of interest judged in the interest degree judgement unit is equal to or less than a predetermined threshold value;
an event judgement unit configured to judge whether a predetermined event occurs based on the image data and the voice data; and
a notification unit configured to transmit a predetermined notification when it is judged by the event judgement unit that the predetermined event occurs,
wherein the predetermined event includes: a first event in which the degree of interest continues to decrease after the changing instruction for causing the first operation to be changed to a second operation; a second event in which the degree of interest is equal to or less than the predetermined threshold value and an appearance of the user disappears from the image data; and a third event in which the gaze direction of the user is not directed toward the terminal and the user continues to emit a voice equal to or larger than a predetermined value for a predetermined time period or more.

16. The interest maintaining system according to claim 15, wherein
the terminal comprises a display unit configured to display a video, and
the first operation is an operation of displaying a first video content on the display unit, and
the second operation is an operation of displaying a second video content on the display unit.

17. The interest maintaining system according to claim 16, wherein
the server performs the image analysis on the image data to detect a motion of the user, and
when a fourth event in which a number of blinks of the eye decreases and the motion of the user decreases occurs, the server transmits a command for reducing a sound volume level of the second video content to the terminal.

18. The interest maintaining system according to claim 15, wherein when the first event occurs, the notification unit transmits a notification for transmitting a live video of a predetermined staff member to the terminal as the predetermined notification.

19. The interest maintaining system according to claim 15, wherein when the second event occurs, the notification unit transmits an e-mail including a predetermined message to a predetermined smartphone as the predetermined notification.

20. The interest maintaining system according to claim 15, wherein when the third event occurs, the notification unit transmits an e-mail including a predetermined message to a predetermined staff member as the predetermined notification.

* * * * *